United States Patent [19]
Gelbart et al.

[11] Patent Number: 5,305,091
[45] Date of Patent: Apr. 19, 1994

[54] OPTICAL COORDINATE MEASURING SYSTEM FOR LARGE OBJECTS

[75] Inventors: Daniel Gelbart; Michel G. Laberge, both of Vancouver, Canada

[73] Assignee: Oreo Products Inc., Burnaby, Canada

[21] Appl. No.: 987,976

[22] Filed: Dec. 7, 1992

[51] Int. Cl.$^5$ .................... G01B 11/14; G01B 11/02
[52] U.S. Cl. ........................... 356/375; 356/358; 356/363; 356/4.5; 33/503; 250/561
[58] Field of Search ............ 356/1, 4, 4.5, 373, 356/375, 376, 141, 152, 345, 356, 363, 358; 250/561, 231.11; 33/502, 503, 504, 556

[56] References Cited

U.S. PATENT DOCUMENTS

| | | | |
|---|---|---|---|
| 4,585,350 | 4/1986 | Pryor | 356/375 |
| 4,621,926 | 11/1986 | Merry et al. | 356/363 |
| 4,627,722 | 12/1986 | Falk et al. | 356/363 |
| 4,647,206 | 3/1987 | Kunzmann et al. | 356/358 |
| 4,790,651 | 12/1988 | Brown et al. | 356/363 |
| 5,106,192 | 4/1992 | Tucker et al. | 356/363 |
| 5,198,877 | 3/1993 | Schulz | 356/376 |

Primary Examiner—Richard A. Rosenberger
Assistant Examiner—Hoa Q. Pham

[57] ABSTRACT

A coordinate measuring system consists of multiple optical transceivers (transmitter-receivers) mounted onto a stable reference frame such as the walls of a room. The object to be measured is touched with a hand-held measuring probe. To measure, the probe triggers the transceivers to read the distance to two retroreflectors mounted on the probe. The location of the probe tip relative to the reference frame is computed from at least six transceiver readings (three for each retroreflector). The accurate determination of the distance between the transceivers and retroreflectors is done by measuring the phase shift of a high frequency modulation superimposed on light beams. To avoid ambiguity two high frequencies are used, one for coarse and one for fine resolution. The initial location of the transceivers can be found out by measuring an accurately known object and computing the transceiver locations. The transceivers include a beam steering device to track the position of the probe.

7 Claims, 5 Drawing Sheets

OPTICAL COORDINATE MEASURING SYSTEM FOR LARGE OBJECTS

BACKGROUND OF THE INVENTION

The invention relates to three dimensional coordinate measuring machines (CMM), and in particular to the measurement of large objects with high accuracy. The need for this type of measurement can be found in many industries such as automotive, machinery, construction, robotics, aerospace and others.

The limitation of conventional coordinate measuring machines for large objects are mainly the cost of the machine and the need to bring the large object to the machine. This becomes less and less practical as the object size exceeds a few meters.

Prior art attempts to solve the problem consisted of connecting the measuring probe to a fixed reference point via the use of articulated arms, such as U.S. Pat. No. 4,606,696 or use of optical methods based on interferometry. An example of optical methods is U.S. Pat. No. 4,627,722 which has limited range and accuracy or U.S. Pat. Nos. 4,790,651, 4,457,625, 4,621,926 and 4,707,129 which offers high accuracy but requires continuous tracking. Since these four patents operate on a purely interferometric principle, any breaking of the beam path will cause the measurement reference to be lost. In other words, the systems described in these four patents are accurate but incremental systems. In order to overcome this limitation of incremental systems and create an absolute measuring system LEICA-KERN (Switzerland) uses a combination of theodolites to measure angles and compute the location of the target. This is a commercially available system, however it has a limited accuracy and is slow.

The problem of measuring points which are not within line-of-sight to the transceivers is addressed by U.S. Pat. No. 4,691,446, French Patent 2,547,916 and commercially available units such as the sonic digitizer made by SAC (Stratford, Conn.)

All these devices use a three point probe in which two of the points are within line-of-sight to the transceivers. Since the points are in line and the distances between the points are accurately known, the location of the hidden point can be computed from the locations of the visible points.

It is the object of this invention to have a high accuracy absolute measuring system capable of measuring large objects. It is another object to provide a measuring system covering a large volume, such as a large area on the production floor, and being able to measure each object in that volume at all stages of fabrication and assembly. It is a further object to provide such a measuring system at a low cost and a modular manner. These and other objects will become apparent after studying the following description in conjunction with the drawings.

SUMMARY OF THE INVENTION

The present invention enables the construction of a coordinate measuring machine out of any stable structure by using optical transceivers to measure the distance to a hand-held probe. As the tip of the probe may be obstructed by the operator or the object being measured, two other reference points are placed on the probe, all three points being located on a straight line. By knowing the distance of these reference points from the transceivers, the location of the probe reference points can be established. Since the distances from the reference points to the probe tip are known, the location of the probe tip can be calculated. The probe tip usually consists of a sphere with a known radius, same as in conventional coordinate measuring machines. Knowing the location of the probe tip and the radius, the surface of the measured object can be located.

From geometric considerations, the minimum number of transceivers per reference point is three, however, the accuracy will increase as the number of transceivers increases. The calculation of the probe tip location is performed as follows:

Assume the location of the first transceiver is $X_1; Y_1; Z_1$ and the "n"th transceiver $X_n; Y_n; Z_n$. The location of the first reference point on the probe is $X_a; Y_a; Z_a$ and the second reference point is $X_b; Y_b; Z_b$. The probe tip location is $X_c; Y_c; Z_c$. $d_{1a}$ is the distance from the first reference point to the first transceiver, $d_{2a}$ is the distance from the first reference point to the second transceiver, etc.

$$d_{1a} = [(X_1-X_a)^2+(Y_1-Y_a)^2+(Z_1-Z_a)^2]^{\frac{1}{2}}$$
$$d_{2a} = [(X_2-X_a)^2+(Y_2-Y_a)^2+(Z_2-Z_a)^2]^{\frac{1}{2}} \quad (1)$$
$$d_{3a} = [(X_3-X_a)^2+(Y_3-Y_a)^2+(Z_3-Z_a)^2]^{\frac{1}{2}}$$

By solving the above set of simultaneous equations, the values of $X_a; Y_a; Z_a$ are found. A similar set of equations is used to find $X_b; Y_b; Z_b$ using the measured values of $d_{1b}; d_{2b}; d_{3b}$.

Once $X_a; Y_a; Z_a$ and $X_b; Y_b; Z_b$ are known the values of $X_c; Y_c; Z_c$ are calculated using the fact that the tip and the two reference points are on a straight line. Assuming the distance between the reference points is $l_1$ and the distance between the reference point near the tip and the tip is $l_2$, the coordinates of the tip are:

$$X_c = X_b + (X_b-X_a)l_2/l_1$$
$$Y_c = Y_b + (Y_b-Y_a)l_2/l_1 \quad (2)$$
$$Z_c = Z_b + (Z_b-Z_a)l_2/l_1$$

There is a built-in redundancy in this calculation since the value $l_1$ is known, but can also be calculated from:

$$l_1 = [(X_b-X_a)^2+(Y_b-Y_a)^2+(Z_b-Z_a)^2]^{\frac{1}{2}}$$

This redundancy can be used as a self-check during measurement. It can also be used when the line of sight from one of the transceivers to one of the reference points is obstructed.

The coordinates of the transceivers $X_n; Y_n; Z_n$ can be calibrated by placing one of the reference points at three accuretely known positions and solving equation (1) in reverse, $X_a; Y_a; Z_a$ being known and $X_n; Y_n; Z_n$ being the unknowns.

Since the probe tip is of a finite size, the radius of the tip has to be added to the measurements of an object in the same manner as done in prior art coordinate measuring machines.

The accurate determination of $d_{1a}; d_{2a}; d_{3a}; d_{1b}; d_{2b}$ and $d_{3b}$ are done using a tellurometer principle. The output beam of a laser diode is amplitude modulated by a high frequency reference. This beam is reflected by retroreflectors at the reference points on the probe and the returned beam, detected at the transceiver, is amplitude demodulated. By comparing the phase of the returned beam to the phase of the reference frequency (the phases of the modulating signal, not the optical carrier) the phase shift is determined. Since the modulating frequency has an accurately known wavelength the phase can be converted to distance using the formula:

$$d = \text{phase}/360° \times c/f \quad (3)$$

c = velocity of light
f = modulation frequency

In order to avoid ambiguity at least two frequencies are used, a lower frequency for coarse ranging and a high frequency for high resolution. The details of distance measurement by using phase measurement are well known in the art and will not be elaborated since they are used by commercial instruments such as Hewlett-Packard Model 3805A Distance Meter, manufactured by the Hewlett-Packard Company, Loveland, Colo.

In order to maintain a high signal-to-noise ratio in the phase measuring circuits it is desired to have the transceivers track the measuring probe thus all the transmitted energy is utilized. Methods of tracking are well known and used in commercial equipment.

BRIEF DESCRIPTION OF THE DRAWINGS

Preferred embodiments of the invention will now be described by way of example, with reference to the accompanying drawings, wherein.

DESCRIPTION OF THE PREFERRED EMBODIMENT

Figure 1:
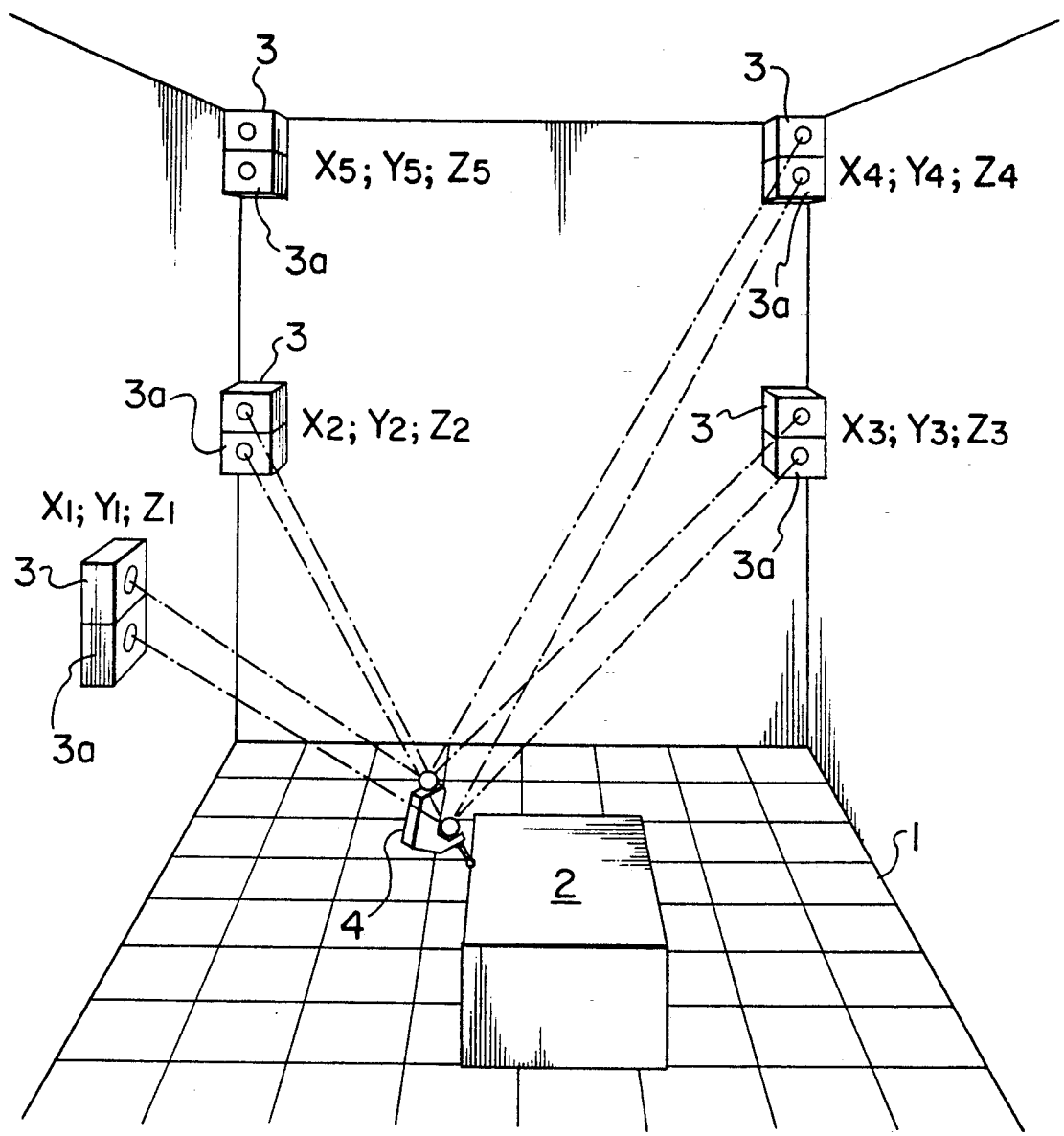
FIG. 1 is a general view of the invention.
Figure 2:
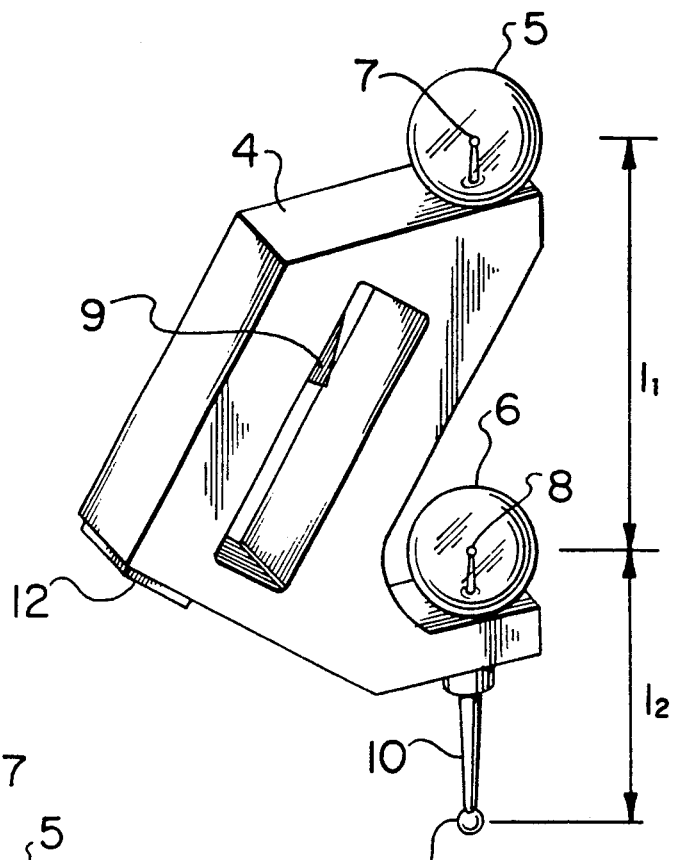
FIG. 2 is an isometric view of the hand-held probe.

Referring now to FIG. 1, an object to be measured 2 is located in room 1. Multiple transceivers 3 and 3a are mounted on stable points in room 1. The transceivers are tracking a cordless probe 4. Referring now to FIG. 2 in conjunction with FIG. 1, probe 4 has two retroreflectors 5 and 6. Transceivers 3 track retroreflector 5 and transceivers 3a track retroreflector 6. The location of each transceiver is known from a prior calibration, to be explained later on. By measuring the distance from the transceivers to the retroreflectors, the location of the retroreflectors can be computed as explained in the previous section. By finding the location of retroreflectors 5 and 6, the location of probe tip 11 can be computed since the center of tip 11 and the centers of the retroreflectors are on a straight line, and the distance between the retroreflectors and the tip are known. In order to facilitate tracking, light sources 7 and 8 are located at the centers of retroreflectors 5 and 6. Each one of these light sources emits light modulated at a unique frequency. Transceivers 3 only respond (and track) the emission of light source 7 while transceivers 3a only respond (and track) source 8. Tip 11 is mounted to probe 4 using stem 10. To initiate a measurement switch 9 is activated. The probe is powered by a removable rechargeable battery 12.

Figure 3:
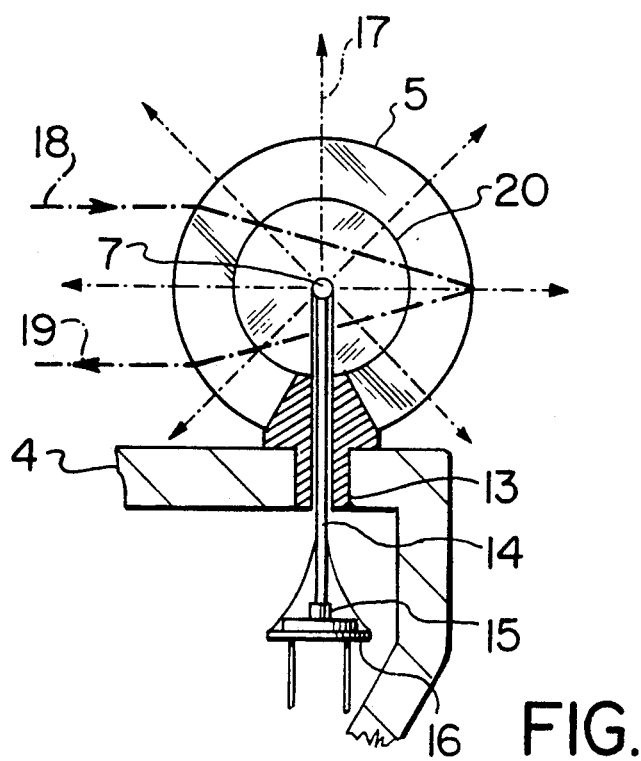
FIG. 3 is a cross-section of the retrorefletor used in the probe.

Further details on the retroreflector and light source are given in FIG. 3. Full details on the retroreflector are covered by a co-pending application titled "Omnidirectional Retroreflector". Prior art retroreflectors are not omnidirectional within the performance and accuracy required by the present invention.

Referring now to FIG. 3, retroreflector 5 consists of a sphere of material transparent to the wavelength of the transceiver and the wavelength of light source 7. Inside sphere 5, a second sphere 20 is concentric with sphere 5. Sphere 20 is made of a material having an index of refraction higher than the outside sphere 5. The radius of sphere 20 is chosen to minimize the spherical abberation of the retroreflector. The outside surface of retroreflector 5 is coated with a partially reflective coating having a reflectivity of 33% at the transceiver wavelength and having a low reflectivity at the wavelength of light source 7. By the way of example, if transceivers 3 and 3a operate at the wavelength of 1300 nm, the outside sphere of retroreflector 5 is made of the acrylic material PMMA having a refractive index of 1.47765 at 1300 mm. The inside sphere 20 is made of SF6 glass having a refractive index of 1.76803 at 1300 nm. The coating reflects 33% at 1300 nm and has low absorbtion. The radius of the outside sphere is 25.4 mm and the radius of sphere 20 is 16.3 mm. Under these conditions the retroreflection error will be below 1 mR for the central 10 mm of retroreflecctor 5. The efficiency of the retroreflector is about 15% (i.e.: abut 15% of the incident light 18 returns to the transceiver as a reflected beam 19).

Retroreflector 5 is mounted to probe 4 using a base 13. In order to form light source 7 an optical light guide 14 is inserted via a hole drilled in base 13 and in inner sphere 20. The light guide, 14, by the way of example, can be a 1 mm diameter glass rod with a silver coating on its outside surface.

One end of the light guide 14 is optically coupled to the emitting area 15 of light emitting diode 16 using an index-matching optical cement. The other end of 14 is ground to a diffusing surface and forms light source 7. Light rays 17 are emitted by source 7 in an approximately omnidirectional pattern.

Figure 4:
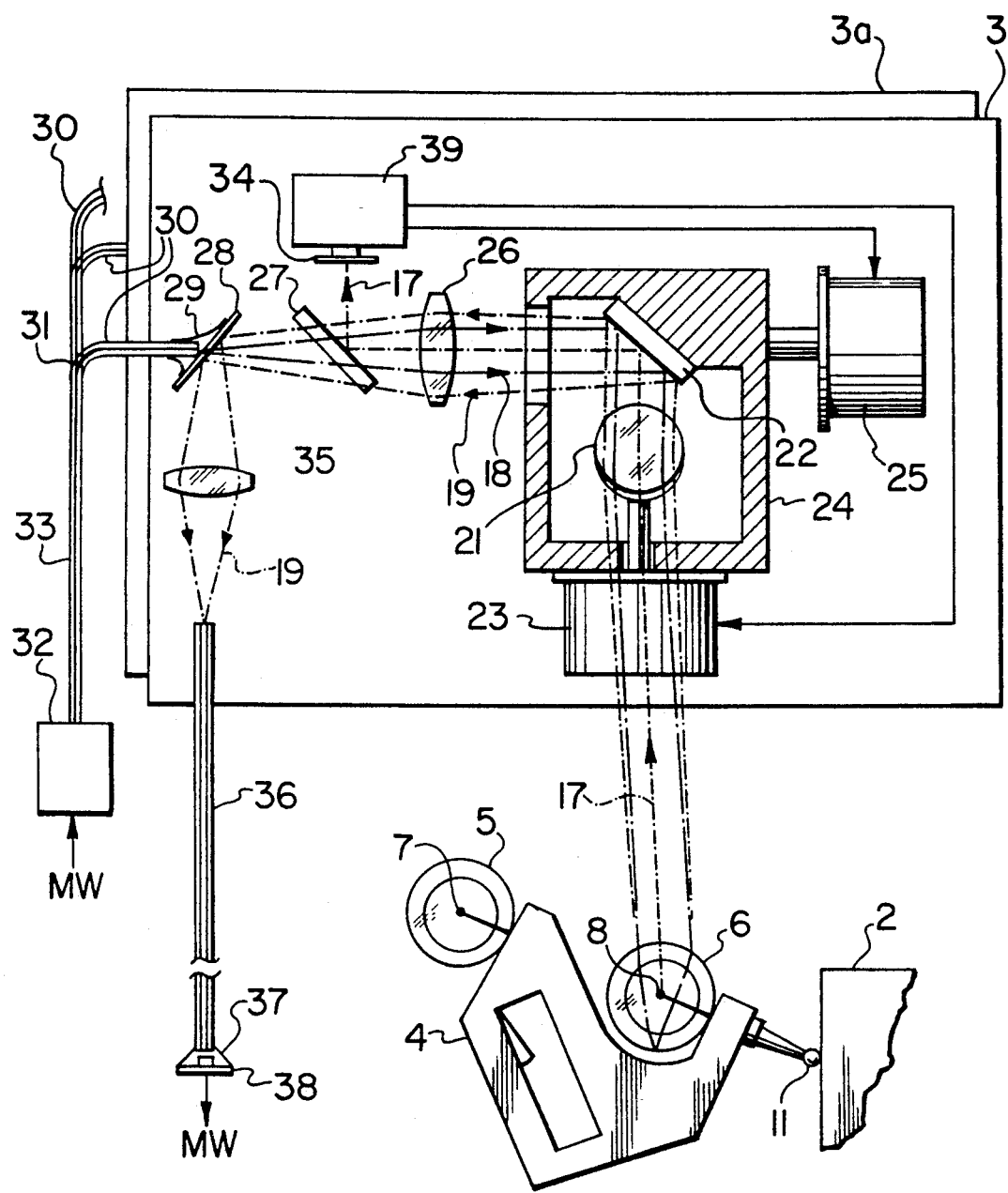
FIG. 4 shows the optical layout of the invention.
Figure 5:
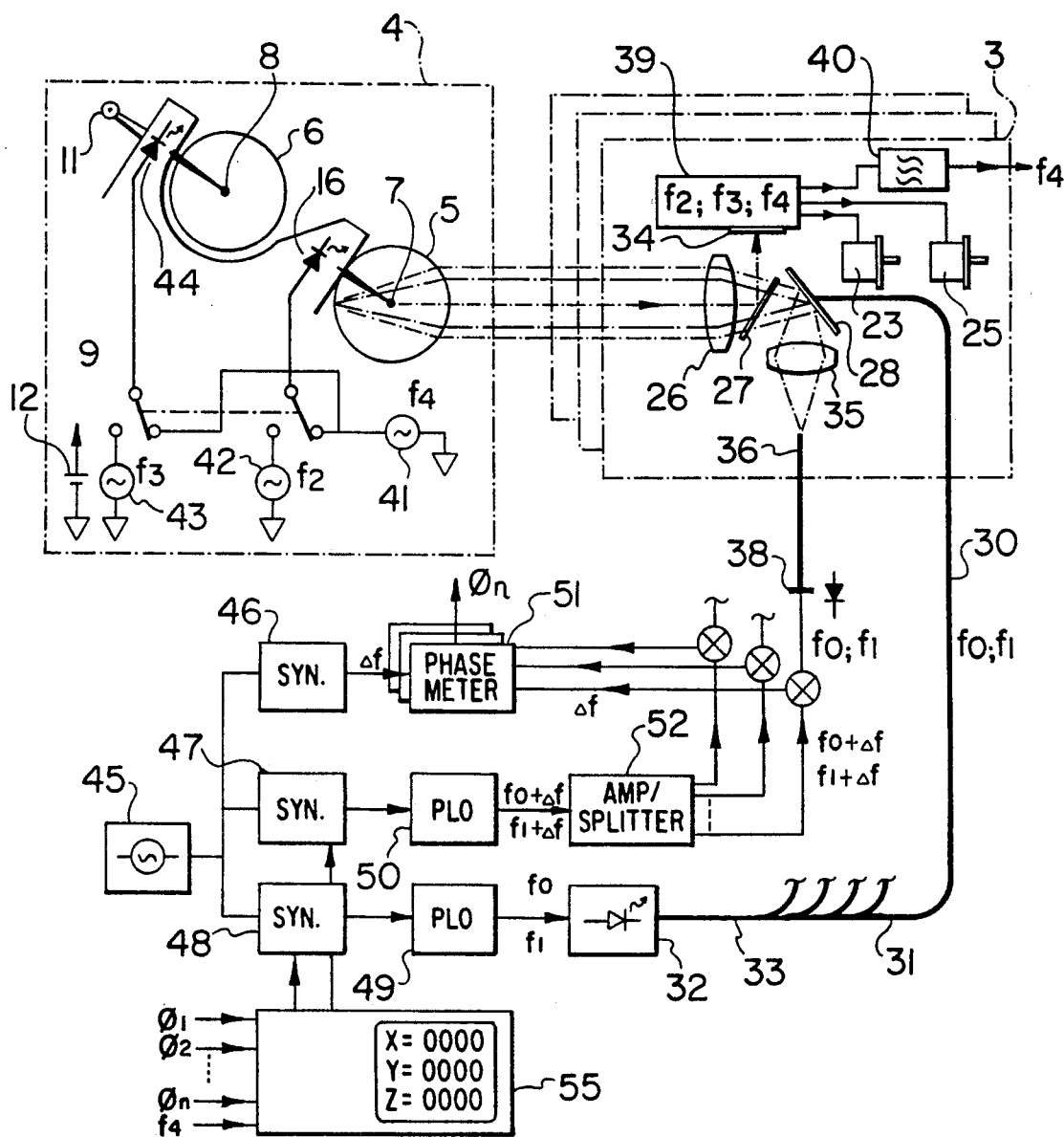
FIG. 5 is a schematic view of the electronic circuits.
Figure 6:
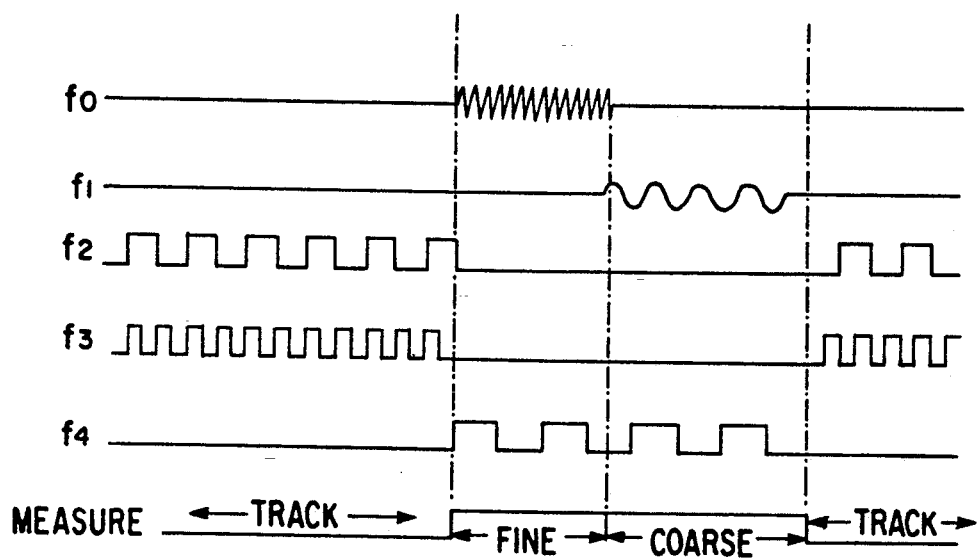
FIG. 6 is a timing diagram of the electronic circuit.

The operation of the complete system is detailed in FIG. 4, FIG. 5 and FIG. 6. The general principle of operation is conversion of phase shift to distance. In order to measure the distance between transceivers 3 and 3a to retroreflectors 5 and 6, a laser beam is modulated in amplitude. The phase of the modulating signal is compared upon its return to the transceiver to the original signal and the phase shift is converted into distance. In order to simplify the transceivers all the optical signals are generated (and detected) at a single location and distributed to the transceivers using optical fibers.

Referring now to FIG. 5, a master oscillator 45 is used to generate multiple frequencies by the use of digital frequency synthesizers 46, 47 and 48. The synthesizers are controlled by computer 55. Since a very high frequency is required for high distance measurement resolution, the output of synthesizers 47, 48 is multiplied by a high ratio using microwave phase-locked-loops 49 and 50. The output of phase-locked-loop 49 can generate frequencies $f_0$ and $f_1$; phase-lock-loop 50 generates two frequencies $f_0 + \Delta f$ and $f_1 + \Delta f$. Typically $f_0$ and $f_1$ are high frequencies, in the GHz range, while $\Delta f$ is in the KHz range.

Frequencies $f_0$ and $f_1$ are used to modulate a laser transmitter 32. The output of the transmitter is coupled via single-mode optical fiber 33 to a splitter 31. The splitter distributes the modulated laser light to all transceivers 3 and 3a via fibers 30 (the operation of the transceiver will be detailed in the next section). The light retroreflected from probe 4 is returned via optical fiber 36 to a photodetector 38 (more details on the optics are given in the next section). Fiber 36 is a large core multimode fiber since the returned light can not be focused to a diffraction limited spot, due to aberrations caused by the retroreflector. Photodetector 38 converts the modulated light to a high-frequency signal, which is fed to mixer 54. The other part of mixer 54 is fed with a frequency higher by $\Delta f$. The mixer output will consist of two frequencies: $\Delta f$ and $2f_0 + \Delta f$ (or $2f_1 + \Delta f$). Since $f_0$ is a high frequency (typically in the GHz range) $2f_0 + \Delta f$ is easily separated from $\Delta f$ in phase-meter 51. Phase meter 51 compares the phase of $\Delta f$ from the reference synthesizer 46 to $\Delta f$ from the mixer 54. The phase difference is proportional to the distance up to one wavelength. After one wavelength the phase will repeat itself. To avoid the ambiguity of multiple wavelength, a second frequency $f_1$ is used to determine the integer number of wavelength that exist in the distance from the transceiver of the retroreflector. This part of the operation of the system is very similar to existing distance meter, or tellurometers, and need not be further detailed here. A detailed discussion can be found in the manual of Model 3805A Distance Meter, made by the Hewlett-Packard Company (Loveland, Colo.). It is also obvious that the number of mixers 54 and phase-meters 51 equals the total number of transceivers 3 and 3a, while all other parts are shared by all transceivers.

The electrical circuit of the probe 4 is also shown in FIG. 5. The probe contains a rechargeable battery pack 12 which powers three oscillators: oscillator 43 at a frequency of $f_3$; oscillator 42 at a frequency of $f_2$ and oscillator 41 at a frequency of $f_4$. In the non-activated position of switch 9 oscillator 43 is connected to light-emitting diode 44 and oscillator 42 is connected to light-emitting diode 16. When a measurement is required, switch 9 is activated causing both light-emitting diodes 16 and 44 to become modulated at a frequency $f_4$. The light emitted by light-emitting diodes 16 and 44 is picked up by detector 34 in the transceivers 3 and 3a and passed to tracking servo 39. Frequencies $f_2$ and $f_3$ are used for tracking and frequency $f_4$ is isolated by band-pass filter 40 and used to activate a measurement cycle in computer 55.

Referring now to FIG. 4, the optical system consists of a laser diode transmitter 32 modulated by microwave frequencies and coupled via single mode fiber 33 to splitter 31, which is typically a 10:1 splitter. Output fibers 30 bring the transmitted beam to transceivers 3 and 3a. Inside each transceiver the tip of fiber 30 is aligned with a small aperture in mirror 28 and held in place via index-matching optical cement 29. The output beam 18 from the fiber 11 is collimated by lens 26 and directed toward retroreflector 5 or 6 using steering mirrors 21 and 22. Mirror 21 is mounted on motor 23 and mirror 22 is mounted on frame 24 which is rotated by motor 25. This tracking arrangement is of conventional design and similar tracking systems are disclosed in prior art, for example U.S. Pat. No. 4,790,651. Beam 18 is retroreflected as beam 19 by retroreflector 6 and, after being reflected by mirrors 21 and 22, is focused by lens 26. Due to aberrations in the retroreflectors, beam 19 can not focus to the diffraction-limited aperture size in mirror 28 thus most of the energy in beam 19 is reflected by mirror 28 and focused into optical multimode fiber 36 by lens 35. This fiber has a significantly larger core than fiber 30, thus the aberrations in beam 19 are not detrimental. Fiber 36 is coupled to a high speed photo-detector 38 by using index-matching optical cement 37.

The tracking system consists of omnidirectional light sources 7 and 8, located at the centers of retroreflectors 5 and 6. The light beam 17 from light source 8 is reflected by mirrors 21 and 22, via lens 26 to a dichroic mirror 27. Mirror 27, which is transparent to the wavelength of beams 18 and 19 reflects beam 17 to position-sensitive detector 34. The output signal of 34 is decoded by tracking control 39 to drive motors 23 and 25 in order to keep beam 17 centered on detector 34. No further details on the tracking function need to be specified since this type of tracking system is commonly used.

Sources 7 and 8 emit light modulated at different frequencies ($f_3$ for source 8 and $f_2$ for source 6), to keep one set of transceivers tracking one of the retroreflectors while the other set only tracks the other retroreflector. Each retroreflector has to be seen by at least three transceivers during the measuring period. Solving the equation for three distances per retroreflector can lead to ambiguity due to a double answer. The minimum number of transceivers required for accurate measurements is four per retroreflector.

Referring now to FIG. 6, a typical sequence is shown. Between measurements, frequencies $f_2$ and $f_3$ are transmitted by light sources 6 and 8 and tracked by transceiver sets 3 and 3a. When the measurement is initiated by depressing switch 9 (in FIG. 2) both light sources switch to a frequency $f_4$. Upon detecting the presence of $f_4$ in the trackers, the computer commands the frequency synthesizers to send out a burst of light modulated by $f_0$ followed by a burst modulated by $f_1$. By measuring the phase shift of the returned $f_0$ and $f_1$ the distance from each transceiver to the probe is established. If at least three distances to each retroreflector are known, the location of the retroreflector can be computed. Referring now to FIG. 1 and FIG. 5, the coordinates of each transceiver need to be accurately known as well as the exact delay, or "optical length", of the connecting fibers 31, 31, 33, 36 and any delays arising from the electronic circuitry. Combining all the delays (optical and electrical) of each transceiver into a single equivalent distance $L_n$ ($n=1, 2, 3$ etc), Equation (1) presented in the "Summary of the Invention" section can be re-written:

$$D1_a = [(X_1 - X_a)^2 + (Y_1 - Y_a)^2 + (Z_1 - Z_a)^2]^{\frac{1}{2}} + L_1$$

$$D2_a = [(X_1 - X_a)^2 + (Y_2 - Y_a)^2 + (Z_2 - Z_a)^2]^{\frac{1}{2}} + L_2 \qquad (3)$$

$$D3_a = [(X_3 - X_a)^2 + (Y_3 - Y_a)^2 + (Z_3 - Z_a)^2]^{\frac{1}{2}} + L_3$$

in order to find $L_1$; $L_2$; $L_3$ ... $L_n$ and $X_1$; $Y_1$; $Z_1$; $X_2$, $Y_2$, $Z_2$ ... $X_n$; $Y_n$; $Z_n$ a calibration process is used. Since each transceiver represents four unknowns; $X_n$, $Y_n$, $Z_n$, $L_n$ a set of four independent equations is required for each one. These equations are generated by using a known object which has 4 accurately known points and locating one of the retroreflectors at a time at each one of those points. Arbitrarily defining the first of the four known points to be the origin of the coordinate system, four equations can be written for each point similar to equation (3). In these equations $X_n$; $Y_n$; $Z_n$; $L_n$ are the unknowns while $d_{na}$ (and $d_{nb}$) are known from the measurement while $X_a$; $Y_a$; $Z_a$ (and $X_b$, $Y_b$, $Z_b$) are known from the known object.

An alternate calibration method is by having the transceivers point at each other in all combinations and solving the set of equations generated similar to equation (3).

Another factor to be considered during calibration is that mirrors 21, 22 in FIG. 4 do not rotate around the same point. If the distance between mirror centers (the points the axis of rotation of the mirror intersects the mirror surface) is X and the measured distance is d, the true distance to the equivalent single point representing the transceiver is $\sqrt{d^2+X^2}$. This factor has to be used when entering the $d_{na}$; $d_{nb}$ values in equation (3).

While the minimal number of transceivers required to locate each retroreflector is three, greatly improved accuracy and reliability of operation will result from having more transceivers per retroreflector. The preferred embodiment uses at lease five transceivers per retroreflector, since four transceivers per retroreflector is the minimum number required to solve equations (1) or (3) without getting two answers, and one transceiver can be obstructed by the operator.

It is also obvious that the probe can be moved from one measuring point to another by the human hand or by mechanised means, such as a robot or a computer controlled machine. In the mechanised case, a touch sensor can be used to initiate the measurement cycle. Touch probes of a suitable design are made by Renishaw Plc. (U.K.)

By the way of example, the following values and components can be used:

| | |
|---|---|
| $f_0$ = 15 GH$_Z$ | $f_2$ = 8 KH$_Z$ |
| $f_1$ = 15.015 GH$_Z$ | $f_3$ = 10 KH$_Z$ |
| $\Delta f$ = 15 KH$_Z$ | $f_4$ = 6 KH$_Z$ |
| Laser transmitter | Lasertron Model QLXS1300MW, $\lambda$ = 13000 nm |
| Photo-detectors | Lasertron Model QDEMW1 |
| Both transmitter and detector made by the Lasertron Corporation, Burlington, MA, U.S.A. | |
| Master Oscillator | 10 MHZ TCXO, Model SC, made by Wenzel Associates (U.S.A.) |
| Phase-locked loops | 1500 × multiplication, Model 5205A DRO, made by Merrit Microwave (U.S.A.) |
| Light emitting diodes (in probe) | Model OD-100, made by Opto-Diodes Corporation, Newbury, California, U.S.A. |

Transceiver uses two stepping motors in microstepping mode; tracking control and filtering is performed by a Digital Signal Processing card inside the computer. Computer is a "PC Compatible" type.

What is claimed is:

1. A three dimensional coordinate measuring system comprising:

a plurality of optical transmitter-receivers (transceivers) mounted at accurately known locations on a fixed and stable reference frame;

a freely moveable probe containing a tip and at least two reference points, the distance from the tip to said reference points accurately known and each of said reference points being within line-of-sight to at least three of said transceivers regardless of the position of said tip;

an omnidirectional retroreflector located at each of said reference points;

a laser modulated by a plurality of accurately known frequencies and coupled to said transceivers using optical fibers, said transceivers including optical means of forming output of said fibers into a collimated light beam steerable in two dimensions, said collimated beam can be independently steered in each one of said transceivers;

means of tracking said retroreflectors with said collimated light beams and means of collecting the retroreflected light of each one of said beams and focusing it onto a separate photo-detector;

means of measuring the phase shift of the output of each one of said photo-detectors relative to the phase of said accurately known frequencies and means of converting this phase shift into distance information, the plurality of said accurately known frequencies used to resolve the ambiguity in the valve of said distance present when only a single frequency is used;

means of computing the location of each retroreflector from its distance to at least three of said transceivers;

and means of computing the location of the said probe tip from the computed location of said retroreflectors.

2. A system as claimed in claim 1 wherein said omnidirectional retroreflectors consist of two concentric spheres made of transparent material and having the refractive index of the inner sphere higher than the refractive index of the outer sphere, the outside sphere coated with a partially reflective coating.

3. A system as claimed in claim 1 wherein said tracking means are a light source located at the center of each of said retroreflectors and being modulated with a different frequency for each one of said retroreflectors in order to allow said transceivers to distinguish between said retroreflectors; said transceivers inducing servomechanism means of pointing to said light sources.

4. A system as claimed in claim 1 wherein said means of collecting the retroreflected light consists of multimode optical fibers.

5. A system as in claim 1 wherein said probe is handheld.

6. A system as claimed in claim 1 wherein said probe is moved by a computer controlled machine.

7. A system as claimed in claim 1 wherein the said probe tip is a sphere with an accurately known radius.

* * * * *